US012345300B2

(12) United States Patent
Courville et al.

(10) Patent No.: US 12,345,300 B2
(45) Date of Patent: Jul. 1, 2025

(54) TAPERED MINOR DIAMETER SPLINE TO INCREASE STRENGTH AND FATIGUE LIFE

(71) Applicant: STEERING SOLUTIONS IP HOLDING CORPORATION, Saginaw, MI (US)

(72) Inventors: Jeffrey P. Courville, Saginaw, MI (US); Eduardo R. Mondragon-Parra, Freeland, MI (US); Jon N. Miller, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 490 days.

(21) Appl. No.: 17/712,441

(22) Filed: Apr. 4, 2022

(65) Prior Publication Data

US 2023/0313840 A1     Oct. 5, 2023

(51) Int. Cl.
*F16D 3/06*     (2006.01)
*B60B 35/14*    (2006.01)
*F16D 3/224*    (2011.01)
*F16D 1/10*     (2006.01)
*F16D 3/223*    (2011.01)

(52) U.S. Cl.
CPC .............. *F16D 3/06* (2013.01); *B60B 35/14* (2013.01); *F16D 3/224* (2013.01); *F16D 2001/103* (2013.01); *F16D 2003/22313* (2013.01); *Y10S 464/906* (2013.01); *Y10T 403/7024* (2015.01); *Y10T 403/7035* (2015.01)

(58) Field of Classification Search
CPC ...... F16D 3/06; F16D 3/224; F16D 2001/103; F16D 2003/22313; B60B 35/14; Y10S 464/906; Y10T 403/7024; Y10T 403/7035
USPC .............................. 464/182; 403/358, 359.6
See application file for complete search history.

(56) References Cited

U.S. PATENT DOCUMENTS

| | | | | |
|---|---|---|---|---|
| 783,762 | A * | 2/1905 | Stahl | F16D 1/0876 403/358 |
| 2,228,770 | A * | 1/1941 | Le Tourneau | F16D 1/092 403/359.6 |
| 8,128,504 | B2 * | 3/2012 | Fukumura | F16D 1/072 464/906 |

* cited by examiner

*Primary Examiner* — Greg Binda
(74) *Attorney, Agent, or Firm* — Dickinson Wright PLLC (57) ABSTRACT

A motor vehicle shaft assembly has a shaft extending along a longitudinal axis between opposite ends, with the shaft having a male spline adjacent at least one of the opposite ends, and a housing having a through bore extending about the longitudinal axis, with the through bore having a female spline configured for meshed engagement with the male spline to prevent relative torsional movement between the shaft and the housing. At least one of the male and female splines includes a tapered spline extending in oblique relation to the longitudinal axis.

5 Claims, 8 Drawing Sheets

FIG. 6B
PRIOR ART

TAPERED MINOR DIAMETER SPLINE TO INCREASE STRENGTH AND FATIGUE LIFE

FIELD OF THE INVENTION

The present disclosure generally relates to shaft assemblies for motor vehicles, and more specifically, to shaft assemblies having a splined connection for joining a shaft to a driven member and/or for joining a drive member to a driven shaft of the shaft assembly.

BACKGROUND OF THE INVENTION

Figure 6A:
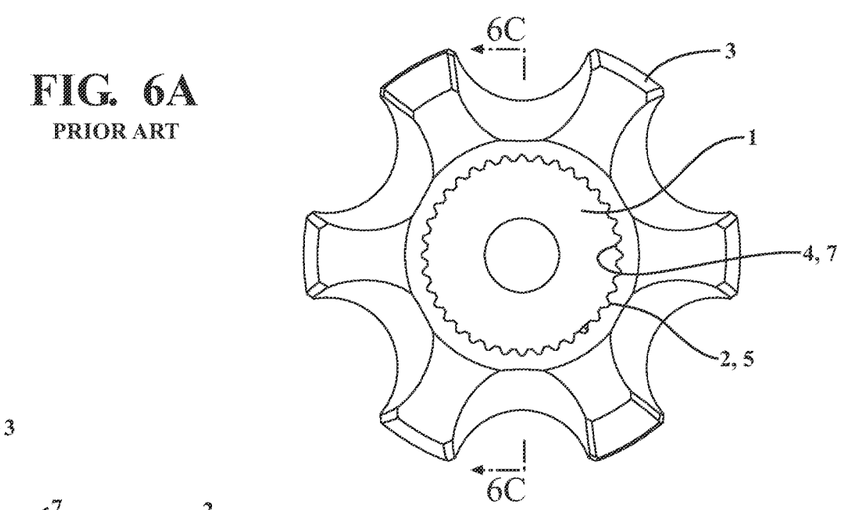
FIG. 6A is an end view of a splined shaft connection illustrating a shaft and an inner race of a constant velocity joint in accordance with the prior art.
Figure 6B:
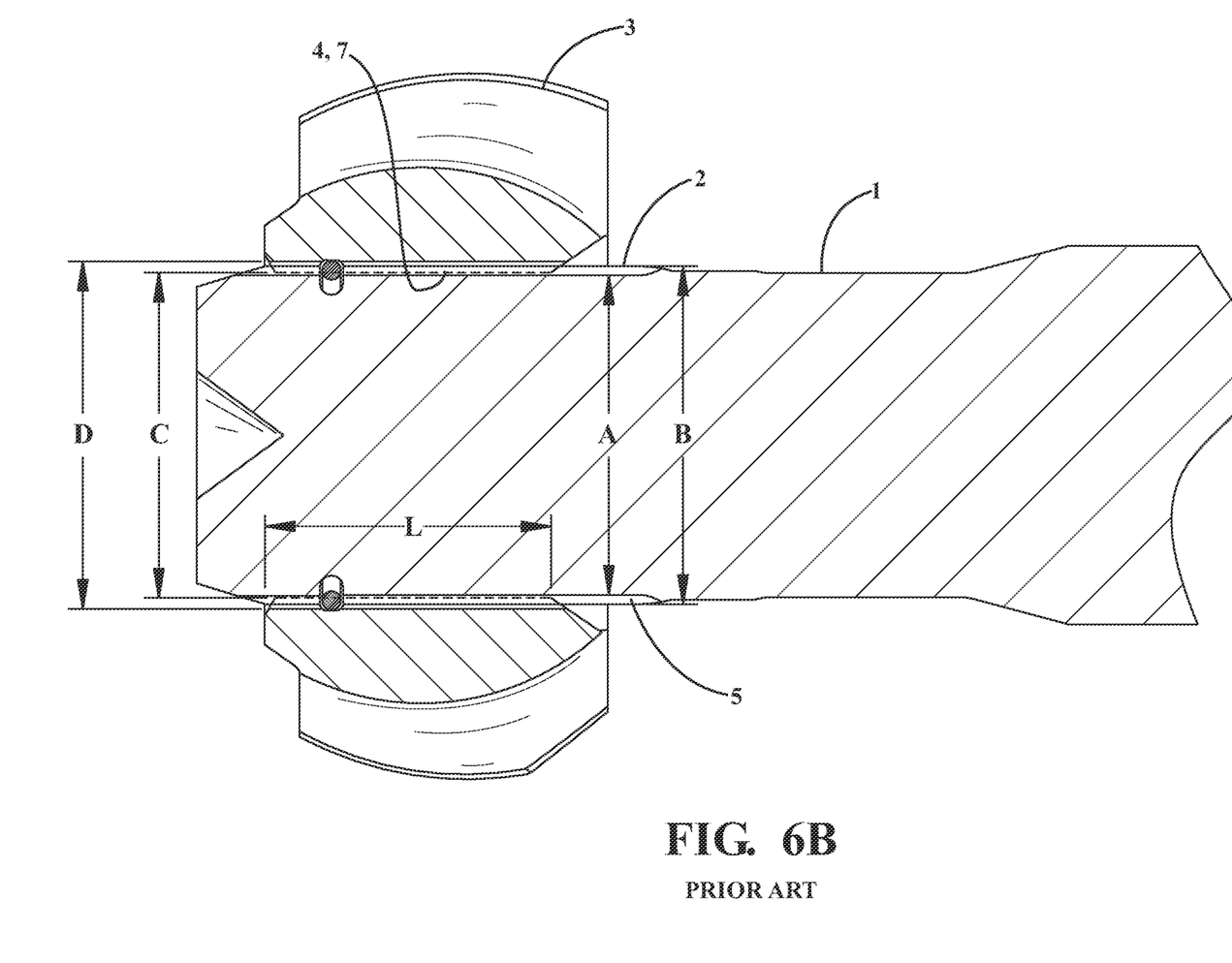
FIG. 6B is a cross-sectional view taken generally along the line 6B-6B of prior art FIG. 6A.
Figure 6C:
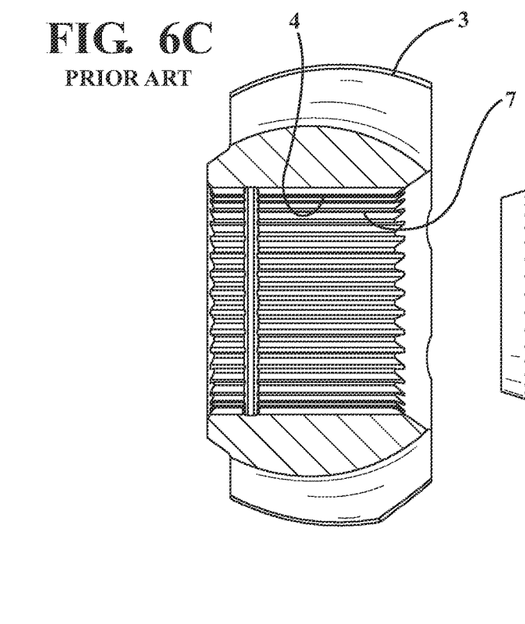
FIG. 6C is a cross-sectional view of the prior art inner race, as shown in FIG. 6B, exploded axially from the shaft, as shown in FIG. 6B.

Automotive shaft assembly applications, such as driveline shaft applications, including half shaft (axle) applications, commonly join an end of the half shaft to a driven member, such as an inner race of a constant velocity joint, via a straight splined connection. As shown in FIGS. 6A-6C, a straight splined connection includes a shaft 1 having an external spline, referred to hereafter as male spline 2, and a housing 3, such as an inner race of a constant velocity joint (CVJ), having an internal spline, referred to hereafter as female spline 4. The male spline 2 is formed by lengthwise extending, straight male teeth 5, with the male teeth 5 extending in parallel relation with a longitudinal axis 6 of shaft 1. The male teeth 5 have a minor diameter A and a major diameter B, wherein the minor diameter A and major diameter B have respective constant diameters along the entirety of their axially extending lengths. Likewise, the female spline 4 has female teeth 7 arranged to extend in parallel relation with the longitudinal axis 6 that have a minor diameter C and a major diameter D, wherein the minor diameter C and major diameter D have respective constant diameters along the entirety of their axially extending lengths. Although the straight splined connection formed between the male spline 2 and the female spline 4 is effective to transmit torque loads and to fix the shaft 1 against relative rotation to the inner race 3, in order to ensure adequate torsional strength and torsional fatigue life is provided across the splined connection to prevent premature failure of the joint formed thereby, it is known to provide the shaft 1 and inner race 3 with an increased size to increase the torsional strength of the joint. It is further known that an increased, longer length of a straight spline joint provides a reduced torsional shear in comparison to a relatively decreased, shorter length straight spline joint, thereby increasing the torsional fatigue life. Accordingly, in order to reduce the torsional shear stress along the joint to preserve the fixed attachment of the shaft 1 to the housing 3, it is known to provide the joint with an increased axially extending length L. Although providing a straight splined joint with an increased size and length L decreases the torsional shear stress, it comes with drawbacks. In particular, the increased size and length of the spline joint increases the overall size and weight of the shaft assembly, which in turn reduces fuel efficiency and requires more space, typically held at a premium when considering optimal design and performance of a vehicle, while also adding cost and reducing fuel efficiency. What is needed is a shaft assembly having spline joint that meets or exceeds torsional strength and torsional stress requirements to provide a long and useful torsional fatigue life, while also having a reduced size and spline length, thereby resulting in a reduced weight, reduced size shaft assembly, thus, enhancing the design and performance of the motor vehicle, while reducing the overall cost thereof.

SUMMARY OF THE INVENTION

It is an object of the present disclosure to provide a Halfshaft assembly for coupling a first shaft of a shaft assembly to a second shaft of the shaft assembly that overcomes at least some of the drawbacks discussed above with known dampening couplers.

It is a further object of the present disclosure to provide a flex coupling assembly that is robust and durable in use, and economical in manufacture and assembly.

It is a further object of the present disclosure to provide a flex coupling assembly that decouples axial and torsional stiffness from bending stiffness, thereby allowing more freedom in design to tune the performance of the decoupling between first and second shafts.

It is a further object of the present disclosure to provide a flex coupling assembly that provides an ability to adjust the bending stiffness of the flex coupling assembly without affecting the torsional stiffness and the axial stiffness and noise and vibration dampening performance of the flex coupling assembly.

It is a further object of the present disclosure to provide a flex coupling assembly that provides an ability to adjust the torsional stiffness of the flex coupling assembly without affecting the bending stiffness and the axial stiffness and noise and vibration dampening performance of the flex coupling assembly.

It is a further object of the present disclosure to provide a flex coupling assembly that provides an ability to adjust the axial stiffness of the flex coupling assembly without affecting the bending stiffness and the torsional stiffness and noise and vibration dampening performance of the flex coupling assembly.

According to the objects and advantages, an aspect of the present disclosure provides a motor vehicle shaft assembly including a shaft extending along a longitudinal axis between opposite ends, with the shaft having a male spline adjacent at least one of the opposite ends. The motor vehicle shaft assembly further includes a housing having a through bore extending about the longitudinal axis, with the through bore having a female spline configured for meshed engagement with the male spline to prevent relative torsional movement between the shaft and the housing. At least one of the male and female splines includes a tapered spline extending in oblique relation to the longitudinal axis. The tapered spline reduces the torsional shear stress across a joint formed between the male and female splines, thereby allowing the overall size, weight and cost of the motor vehicle shaft assembly to be minimized.

In accordance with another aspect of the disclosure, the tapered spline has a major diameter and a minor diameter, wherein the minor diameter varies constantly in a lengthwise direction.

In accordance with another aspect of the disclosure, the major diameter is constant along the length of the tapered spline.

In accordance with another aspect of the disclosure, the male spline and the female spline can be formed to each have a non-tapered region with a minor diameter that is constant.

In accordance with another aspect of the disclosure, the male spline and the female spline can each have the tapered spline for arranged for meshed engagement with one another.

In accordance with another aspect of the disclosure, the minor diameter of the tapered spline of the male spline has a first minor diameter at one end of the tapered spline in proximal relation with the at least one of the opposite ends and a second minor diameter at an opposite end of the tapered spline in distal relation with the at least one of the opposite ends, wherein the first minor diameter is less than the second minor diameter.

In accordance with another aspect of the disclosure, the minor diameter of the tapered spline of the female spline has a first minor diameter and a second minor diameter, with the first minor diameter of the female spline being less than the second minor diameter of the female spline, wherein the first minor diameter of the female spline is configured for fixed, meshed engagement with the first minor diameter of the male spline and the second minor diameter of the female spline is configured for fixed, meshed engagement with the second minor diameter of the male spline.

In accordance with another aspect of the disclosure, the major diameters of the tapered splines of the male spline and the female spline are constant.

In accordance with another aspect of the disclosure, the shaft is a half shaft of a drivetrain.

In accordance with another aspect of the disclosure, the housing is an inner race of a constant velocity joint.

In accordance with another aspect of the disclosure, a constant velocity joint assembly is provided. The constant velocity joint assembly includes a half shaft extending along a longitudinal axis between opposite ends. The half shaft has a male spline adjacent at least one of the opposite ends. The constant velocity joint assembly further includes a constant velocity joint having an inner race, an outer race and a plurality of rollers between the inner race and the outer race. The inner race has a through bore extending about the longitudinal axis. The through bore has a female spline configured in meshed engagement with the male spline of the half shaft to prevent relative rotation between the half shaft and the inner race, wherein at least one of the male spline and the female spline has a tapered minor diameter.

In accordance with another aspect of the disclosure, each of the male spline and the female spline of the constant velocity joint assembly has a tapered minor diameter.

In accordance with another aspect of the disclosure, each of the male spline and the female spline of the constant velocity joint assembly has a constant major diameter.

In accordance with another aspect of the disclosure, each of the male spline and the female spline of the constant velocity joint assembly has a tapered minor diameter.

In accordance with another aspect of the disclosure, the tapered minor diameters of the male spline and the female spline of the constant velocity joint assembly each vary constantly in a lengthwise direction.

In accordance with another aspect of the disclosure, each of the male spline and the female spline of the constant velocity joint assembly has a lengthwise extending region with a constant minor diameter configured for radially aligned, meshed engagement with one another.

In accordance with another aspect of the disclosure, the lengthwise extending region of said male spline having a constant minor diameter is between the at least one of the opposite ends and the tapered minor diameter of the male spline.

In accordance with another aspect of the disclosure, a method of reducing torsional shear stress across a spline joint of a constant velocity joint assembly is provided. The method includes, providing a shaft extending along a longitudinal axis between opposite ends and providing a male spline adjacent one of the opposite ends. Further, providing an inner race having a through bore with a female spline configured for meshed engagement with the male spline to prevent relative rotation between the shaft and the housing.

Further yet, providing at least one of the male spline and the female spline having a tapered spline.

In accordance with another aspect of the disclosure, the method can further include providing the tapered spline having a tapered minor diameter and a constant major diameter.

In accordance with another aspect of the disclosure, the method can further include providing each of the male spline and the female spline having the tapered spline.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
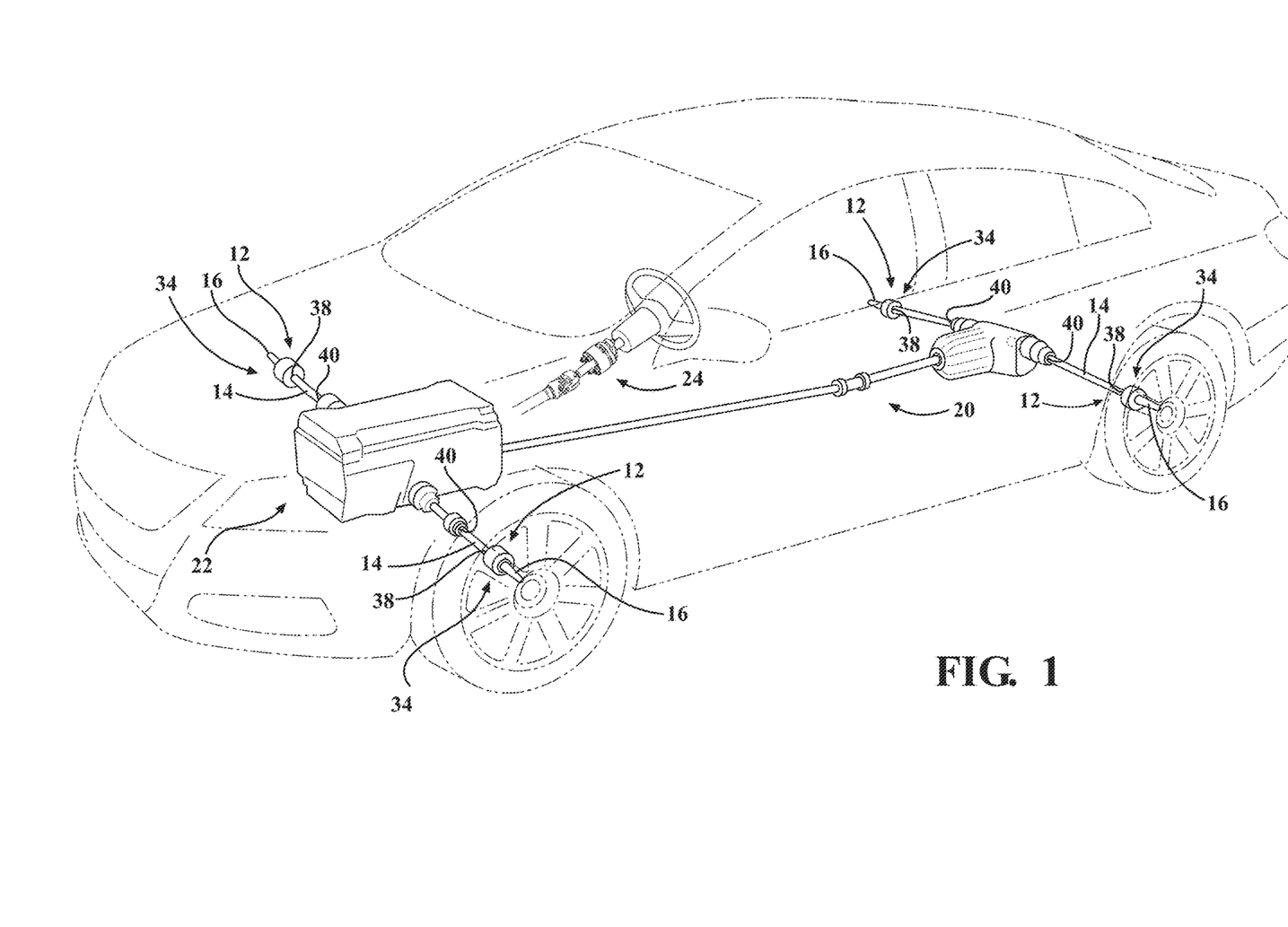
FIG. 1 is a perspective view of a motor vehicle having one or more splined shaft connections constructed in accordance with one aspect of the disclosure.

Referring now to the Figures, where the invention will be described in greater detail with reference to specific embodiments, without limitation, FIG. 1 illustrates a motor vehicle 10 having one or more motor vehicle shaft assemblies 12, such as a constant velocity joint (CVJ) shaft assembly, by way of example and without limitation, and referred to hereafter as shaft assembly 12 (identified in greater detail in FIGS. 2A-2D) arranged in accordance with one aspect of the disclosure for operably coupling a first shaft 14 of the shaft assembly 12, referred to as a half shaft of the shaft assembly 12, to a second shaft 16. In the non-limiting, exemplary embodiment illustrated, a splined connection, also referred to as splined joint 18, is integrated into the shaft assembly 12 of the motor vehicle 10, although it is contemplated herein that the splined connection 18 could be integrated into other shaft assemblies, including other shaft assemblies of a drive shaft assembly 20, axle assembly 22, steering assembly 24, or otherwise. The splined connection 18, as discussed further hereafter, provides an ability to reduce the torsional shear stress across the shaft assembly 12 without having to increase the overall size of the shaft assembly 12, and without having to increase the length of the splined connection 18, thereby allowing the overall size, weight and cost of the shaft assembly 12 to be minimized.

The shaft assembly 12 is configured to facilitate the rotation, articulation, angulation, and/or plunging (tripot style) of the first shaft 14 relative to the second shaft 16. A constant velocity joint (CVJ) 34 of shaft assembly 12 includes an outer member, also referred to as outer housing 26 (FIG. 2A), that is operatively connected to an inner member, also referred to as inner housing or inner race 28, and to the first shaft 14 of the shaft assembly 12. A plurality of rolling elements 30 are disposed between the outer housing 26 and the inner race 28 to facilitate low friction movement therebetween.

Figure 2A:
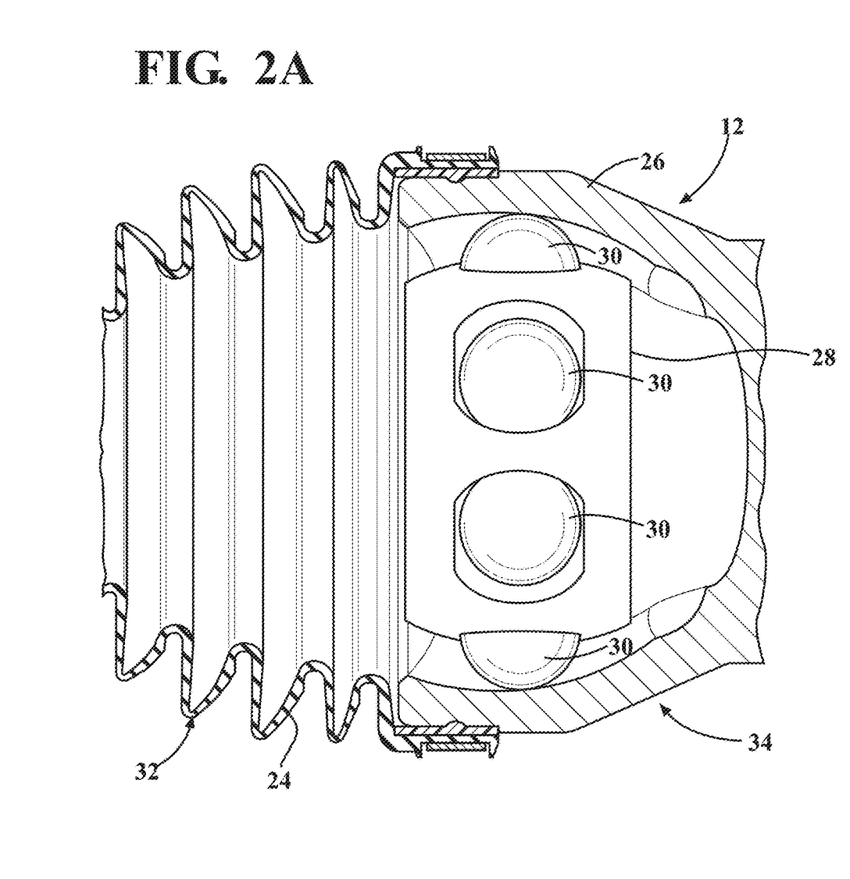
FIG. 2A is a cross-section view of a constant velocity joint assembly of the motor vehicle of FIG. 1 having a splined shaft connection constructed in accordance with one aspect of the disclosure.

A boot assembly 32 is disposed about at least a portion of the outer housing 26 of the constant velocity joint 34 and about a portion of the second shaft 16 extending from the constant velocity joint 34. The constant velocity joint boot assembly 32 is arranged to retain a lubricant, such as grease, within the constant velocity joint 34 and to inhibit the ingress of outside contaminants, such as dirt, stones, water and the like, into the constant velocity joint 34.

Shaft assembly 12 includes the first shaft 14 that extends along a longitudinal axis 36 between opposite ends, referred to as proximal end 38 and distal end 40, with a male spline 42 provided adjacent at least one of the opposite ends, and shown as being provided extending from and/or immediately adjacent proximal end 38. Shaft assembly 12 further includes inner housing (inner race) 28 having a through bore 44 extending about the longitudinal axis 36, with the through bore 44 having a female spline 46 configured for meshed engagement with the male spline 42 to prevent relative torsional movement between the first shaft 14 and the inner housing 28. To provide increased strength and decreased torsional shear stress across the splined joint 18, at least one of the male spline 42 and the female spline 46 (meaning one or both) includes a tapered spline, with male spine 42 shown having a male tapered spline 50a and female spline 46 shown having a female tapered spline 50b, by way of example and without limitation. The tapered splines 50a, 50b extend in oblique, inclined relation (non-parallel and/or non-linear) to the longitudinal axis 36.

Figures 2B, 2D:
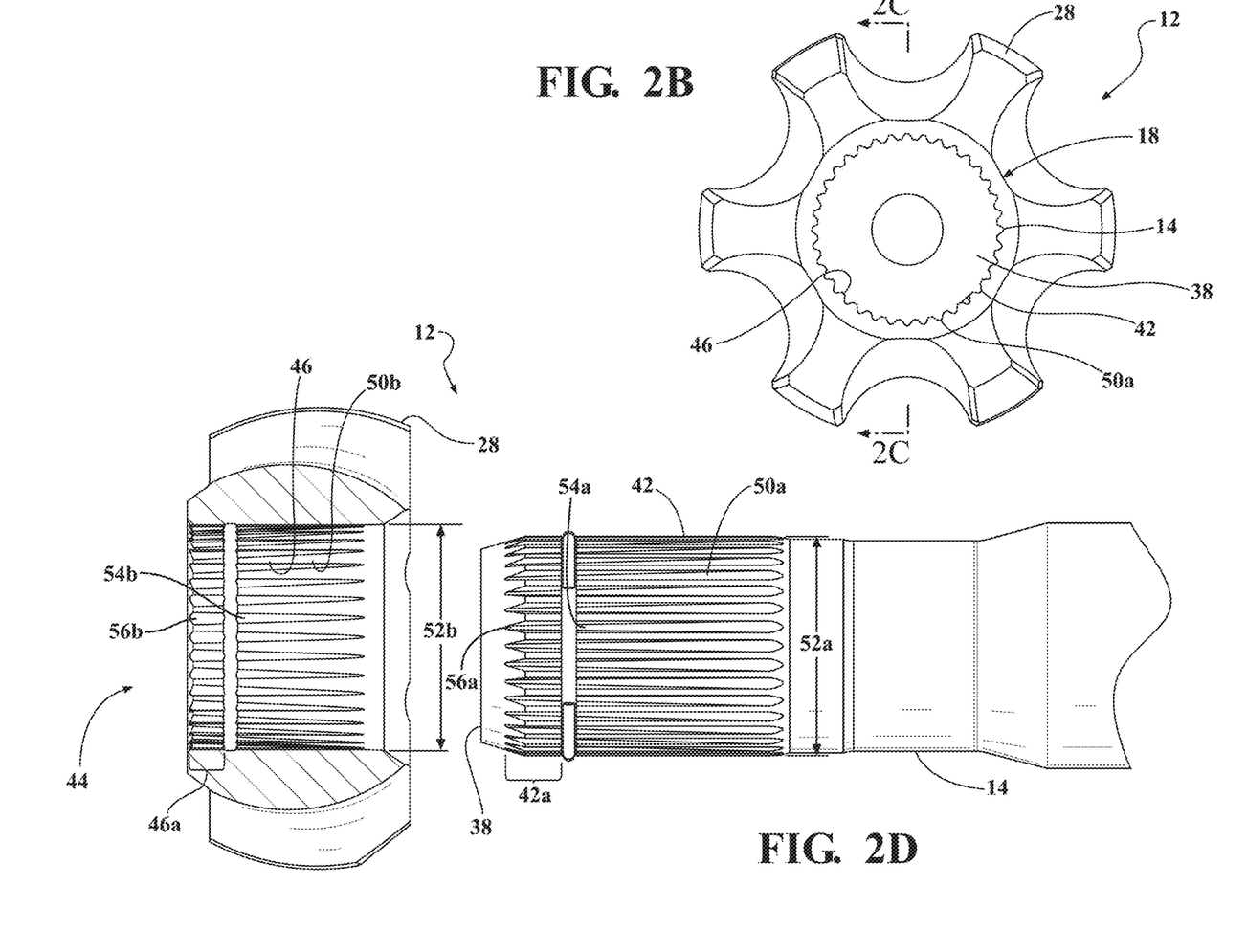
FIG. 2B is an end view of the splined shaft connection of FIG. 2A illustrating a shaft and an inner race of the constant velocity joint in accordance with one aspect of the disclosure.
FIG. 2D is a cross-sectional view of inner race as shown in FIG. 2C exploded axially from a side view of the shaft of FIG. 2C.
Figure 2C:
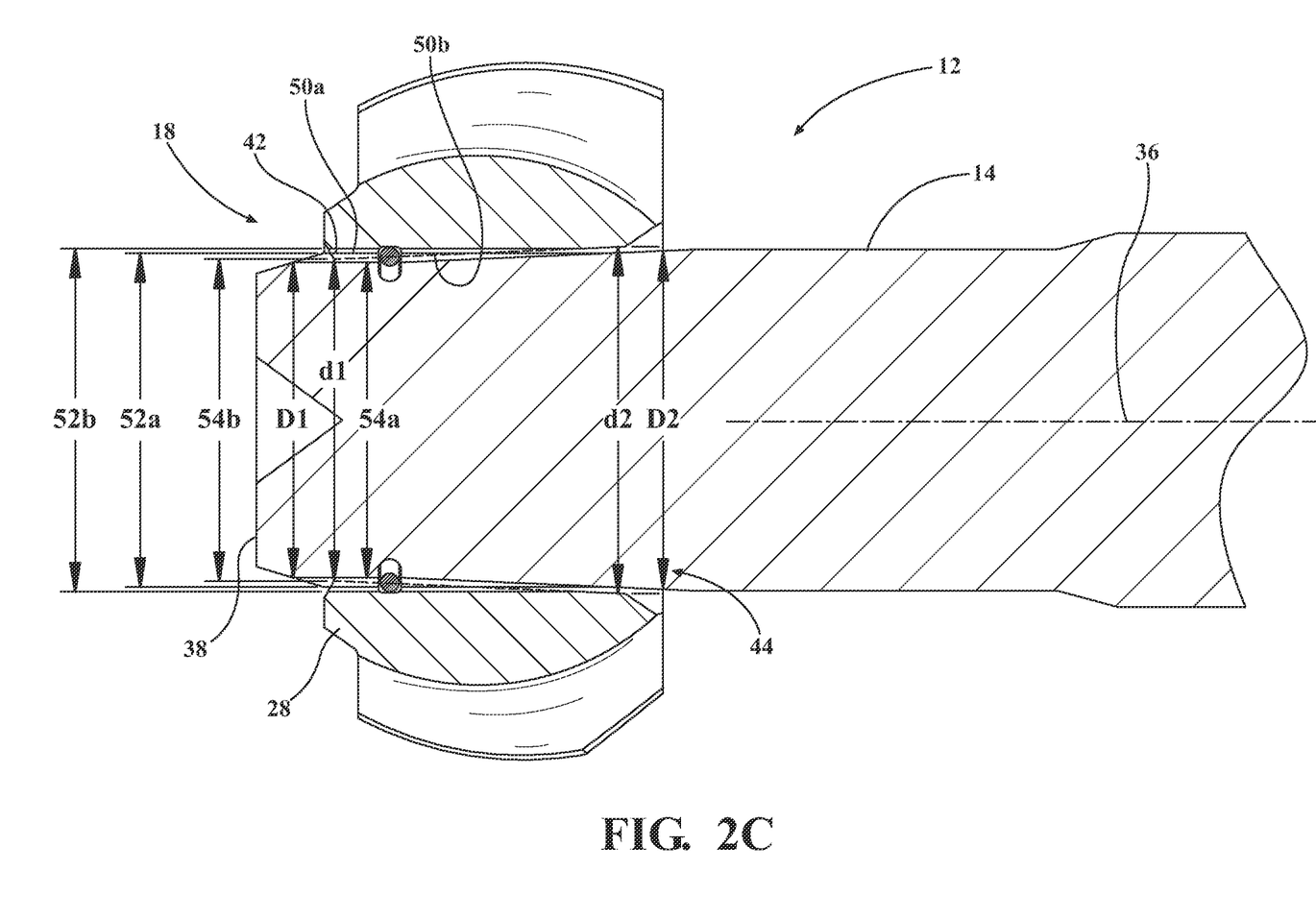
FIG. 2C is a cross-sectional view taken generally along the line 2C-2C of FIG. 2B.
Figure 3:
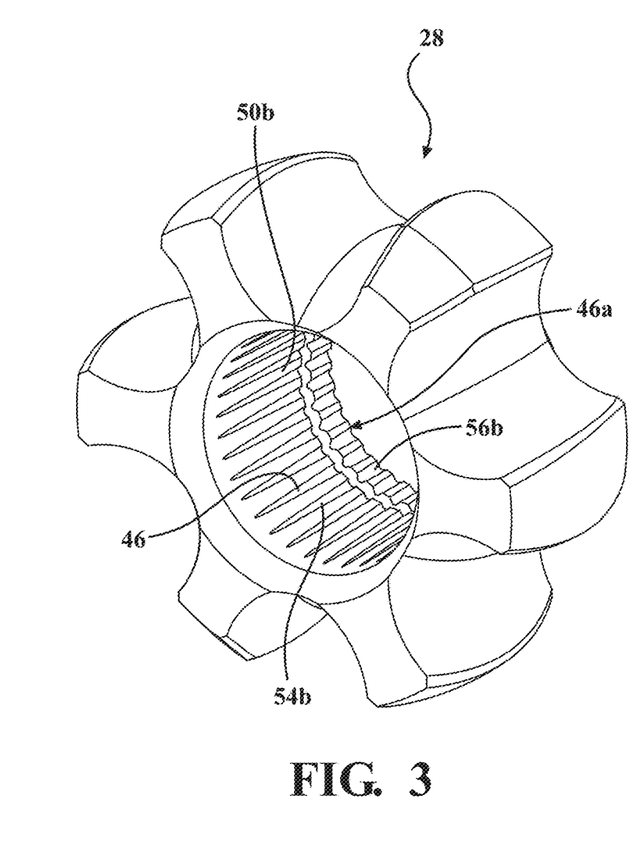
FIG. 3 a perspective view of the inner race of FIGS. 2A-2C.

As best shown in FIGS. 2C and 2D, each of the male and female tapered splines 50a, 50b have a major diameter 52a, 52b and a minor diameter 54a, 54b, respectively (major and minor diameters have a customary meaning, as understood by persons of ordinary skill in the art of splined shaft connections). The major diameters 52a, 52b are constant along the entirety of the axially extending lengths of the male and female tapered splines 50a, 50b, while the minor diameters 54a, 54b vary in a lengthwise direction along the entirety of the axially extending lengths of the male and female tapered splines 50a, 50b. In accordance with one non-limiting aspect of the disclosure, the minor diameters 54a, 54b vary constantly in a lengthwise direction along the entirety of the axially extending lengths of the male and female tapered splines 50a, 50b.

The male minor diameter 54a of the male tapered spline 50a has a male first minor diameter D1 at one end of the male tapered spline 50a in proximal relation (close relation) with the proximal end 38 of first shaft 14 and a male second minor diameter D2 at an opposite end of the male tapered spline 50a in distal relation (distant relation) with the proximal end 38 of first shaft 14. The male first minor diameter D1 is less than the male second minor diameter D2, and in the illustrated nonlimiting embodiment, the male minor diameter 54a extends axially along a constant taper (inclination) relative to the longitudinal axis 36. Accordingly, the male minor diameter 54a gradually and continuously increases from the male first minor diameter D1 to the male second minor diameter D2. Meanwhile, as discussed above, the male major diameter 52a extends along a constant, non-varying diameter along the entirety of male spline 42.

The female minor diameter 54b of female tapered spline 50b has a female first minor diameter d1 at one end of the female tapered spline 50b and a female second minor diameter d2 at an opposite end of the female tapered spline 50b. The female first minor diameter d1 of female spline 46 is less than the female second minor diameter d2 of female spline 46, and in the illustrated non-limiting embodiment, the female minor diameter 54b extends axially along a constant taper (inclination) relative to the longitudinal axis 36. Accordingly, the female minor diameter 54b gradually and continuously increases from the female first minor diameter d1 to the female second minor diameter d2. Meanwhile, as discussed above, the female major diameter 52b extends along a constant, non-varying diameter along the entirety of female spline 46. The female first minor diameter d1 of female spline 46 is configured for radially aligned, fixed engagement with the male first minor diameter D1 of male spline 42 and the female second minor diameter d2 of female spline 46 is configured for radially aligned, fixed engagement with the male second minor diameter D2 of male spline 42.

Figure 4:
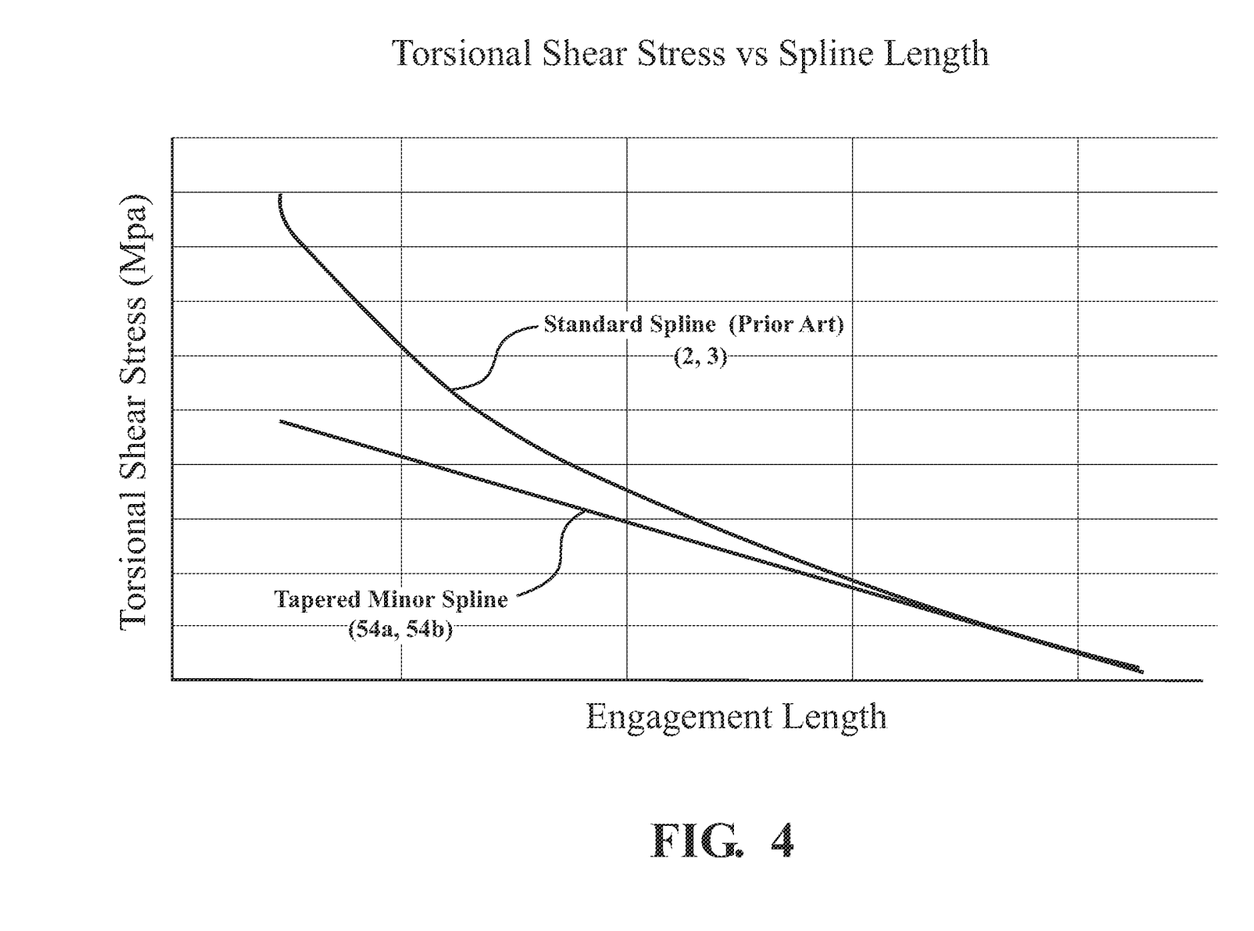
FIG. 4 is a graph of torsional shear stress versus spline engagement length of splined shaft connections of prior art splined connections and tapered splined connections in accordance with the disclosure.

With the male spline 42, and male tapered spline 50a thereof, and the female spline 46, and female tapered spline 50b thereof, being meshed with one another to prevent relative rotation therebetween, the torsional shear stress across the splined joint 18 formed thereby is reduced relative to a non-tapered spline joint having a non-tapered male spline 2 meshed with a non-tapered female spline 4, as graphically exhibited in FIG. 4. Accordingly, the relative length of the tapered spline joint 18 is able to be reduced, while having a reduced torsional shear stress as compared to a same length non-tapered splined joint, thus, allowing the size and weight of the shaft assembly 12 to be reduced.

In accordance with a further aspect of the disclosure, if desired, the male spline 42 and female spline 46 can each have a respective non-tapered region 42a, 46a spaced axially from the respective male tapered spline 50a and female tapered spline 50b having respective male and female minor diameters 56a, 56b that are constant. It is to be understood that male and female major diameters corresponding to the male and female minor diameters 56a, 56b are also constant. The non-tapered, constant male and female minor diameters 56a, 56b can be provided having the same or reduced minor diameters relative to male and female minor diameters D1, d1.

Figure 5:
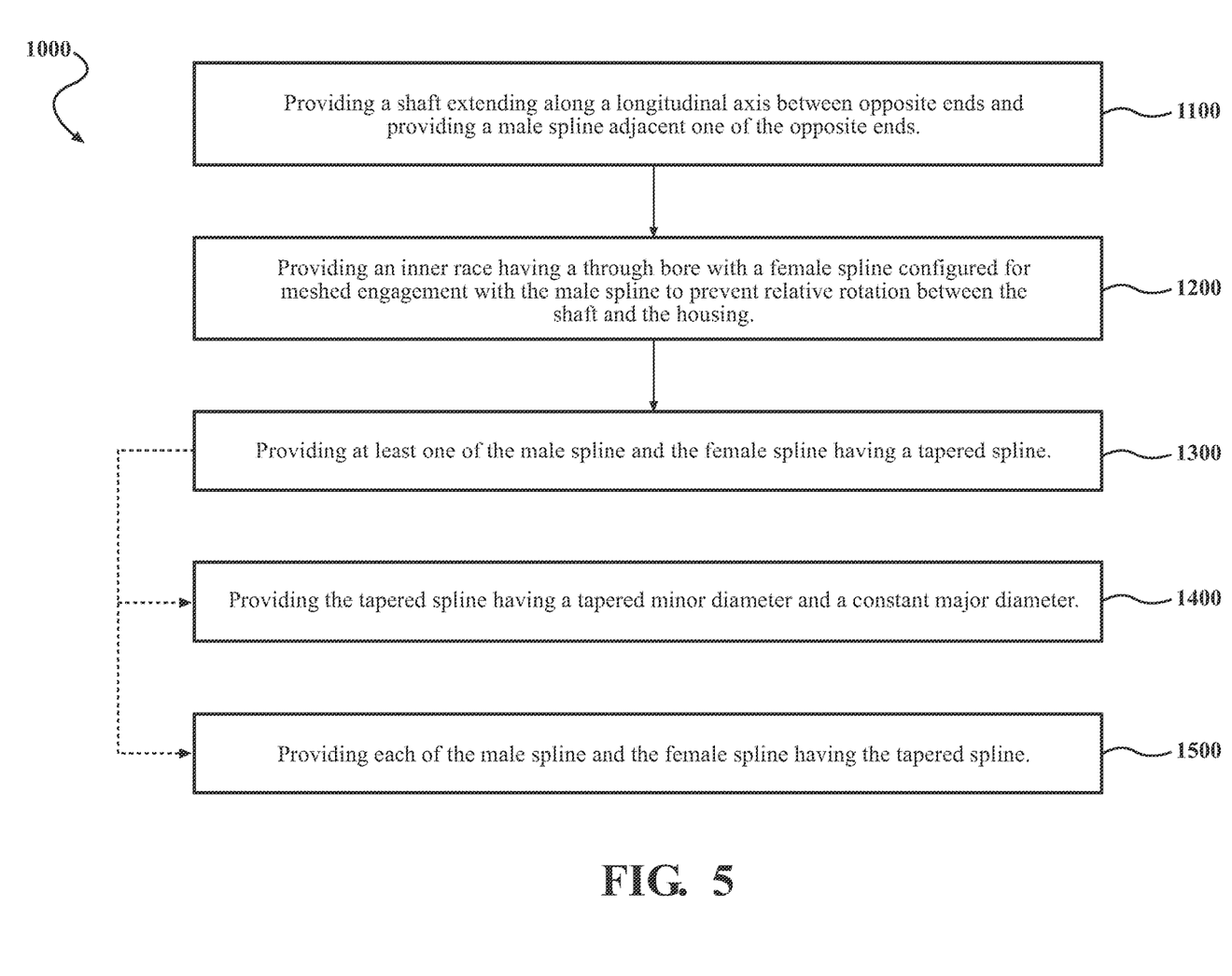
FIG. 5 is a flow diagram illustrating a method of reducing torsional shear stress across a spline joint of a constant velocity joint assembly.

In accordance with a further aspect of the disclosure, a method 1000 of reducing torsional shear stress across a spline joint 18 of a constant velocity joint assembly 12 is provided. The method 1000 includes a step 1100 of providing a shaft 14 extending along a longitudinal axis 36 between opposite ends 38, 40 and providing a male spline 42 adjacent one of the opposite ends 38; a step 1200 of providing a housing, shown as an inner race 28, having a through bore 44 with a female spline 46 configured for meshed engagement with the male spline 42 to prevent relative rotation between the shaft 14 and the housing 28, and a step 1300 of providing at least one of the male spline 42 and the female spline 46 having a tapered spline 50$a$, 50$b$, respectively.

The method 1000 can further include a step 1400 of providing the tapered spline 50$a$, 50$b$ having a tapered minor diameter 54$a$, 54$b$, respectively, and a constant major diameter 52$a$, 52$b$, respectively.

The method 1000 can further include a step 1500 of providing each of the male spline 42 and the female spline 46 having the tapered spline 50$a$, 50$b$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A constant velocity joint assembly, comprising:
   a half shaft extending along a longitudinal axis between opposite ends and having a male spline adjacent at least one of said opposite ends; and
   a constant velocity joint having an inner race, an outer race and a plurality of rollers between said inner race and said outer race, said inner race having a through bore extending about said longitudinal axis with a female spline configured in meshed engagement with said male spline of said half shaft to prevent relative rotation between said half shaft and said inner race,
   wherein each of said male spline and said female spline has a tapered minor diameter.

2. The constant velocity joint assembly of claim 1, wherein each of said male spline and said female spline has a substantially constant major diameter.

3. The constant velocity joint assembly of claim 2, wherein said tapered minor diameters each vary constantly in a lengthwise direction.

4. The constant velocity joint assembly of claim 2, wherein each of said male spline and said female spline has a lengthwise extending region with a constant minor diameter configured for radially aligned, meshed engagement with one another.

5. The constant velocity joint assembly of claim 4, wherein said lengthwise extending region of said male spline having a constant minor diameter is between said at least one of said opposite ends and said tapered minor diameter of said male spline.

\* \* \* \* \*